(12) United States Patent
Spanger

(10) Patent No.: US 9,989,268 B1
(45) Date of Patent: Jun. 5, 2018

(54) WALL SLEEVE FOR WALL MOUNTED MINISPLIT (DUCTLESS) AIR CONDITIONER EVAPORATORS

(71) Applicant: Gerald Spanger, Edison, NJ (US)

(72) Inventor: Gerald Spanger, Edison, NJ (US)

( * ) Notice: Subject to any disclaimer, the term of this patent is extended or adjusted under 35 U.S.C. 154(b) by 0 days. days.

(21) Appl. No.: 15/873,333

(22) Filed: Jan. 17, 2018

Related U.S. Application Data

(60) Provisional application No. 62/569,159, filed on Oct. 6, 2017.

(51) Int. Cl.
| | |
|---|---|
| *F24F 1/52* | (2011.01) |
| *F24F 1/62* | (2011.01) |
| *F24F 13/08* | (2006.01) |
| *F24F 1/00* | (2011.01) |

(52) U.S. Cl.
CPC .............. *F24F 1/52* (2013.01); *F24F 1/62* (2013.01); *F24F 13/08* (2013.01); *F24F 2001/0092* (2013.01)

(58) Field of Classification Search
CPC ...... F24F 1/52; F24F 1/62; F24F 13/08; F24F 2001/0092; F24F 1/02; F24F 3/12; F24F 3/16; F24F 1/08; F24F 13/20; F24F 7/013; F24F 13/10; F24F 7/02; F24F 13/14; Y02B 30/563; Y02B 30/78
USPC ........................................................ 454/352
See application file for complete search history.

(56) References Cited

U.S. PATENT DOCUMENTS

| | | | | |
|---|---|---|---|---|
| 4,613,166 A | * | 9/1986 | Schmidtchen | F16L 25/01 285/53 |
| 5,716,271 A | * | 2/1998 | Paidosh | D06F 58/20 137/527.8 |
| 6,099,607 A | * | 8/2000 | Haslebacher | F24F 3/1607 55/356 |
| 7,398,770 B2 | * | 7/2008 | Acuna, Sr. | F02B 29/0443 123/41.19 |
| 2001/0029164 A1 | * | 10/2001 | Fikes | F24F 7/007 454/236 |
| 2005/0054282 A1 | * | 3/2005 | Green | F24F 5/0035 454/201 |
| 2013/0137360 A1 | * | 5/2013 | Zhong | F24F 7/00 454/341 |

* cited by examiner

*Primary Examiner* — Mohammad M Ali
(74) *Attorney, Agent, or Firm* — Oliff PLC

(57) ABSTRACT

An assembly for mounting in a wall includes a first tube having a flange at a first end of the first tube, the flange to be secured against an inner wall panel, a first hose-guide adjacent the first end of the first tube; a second tube having a faceplate flange attached to a second end of the second tube, the faceplate flange to be secured against an outer wall panel, a second hose-guide adjacent the second end of the second tube; and a hood attachable to an outer side of the faceplate flange. A first distance between the first hose-guide and an inner periphery of the first tube is greater than a second distance between the second hose-guide and an inner periphery of the second tube so that a hose guided by the hose-guides slopes downwardly as it exits the building through the wall.

22 Claims, 14 Drawing Sheets

WALL SLEEVE FOR WALL MOUNTED MINISPLIT (DUCTLESS) AIR CONDITIONER EVAPORATORS

This nonprovisional application claims the benefit of U.S. Provisional Application No. 62/569,159 filed Oct. 6, 2017. The entire contents of the above-identified application is hereby incorporated by reference in its entirety.

BACKGROUND

The disclosure relates to improved wall sleeve assemblies for the installation of Minisplit (also referred to as ductless) air conditioner evaporators, also known as indoor units, which are installed on vertical wall surfaces.

All wall mounted air conditioner evaporators for minisplit systems require four connections: (1) a condensate drain hose, (2) an electrical cable, which is usually inserted through the wall from the exterior of the building, and (3)-(4) two insulated copper refrigerant pipes, which are commonly referred to as a lineset.

The condensate hose, which typically is supplied with the evaporator, consists of a short length of insulated drain hose that is usually about 18 inches long, but can vary from one manufacturer to another. One end of the condensate hose is connected to the condensate drain pan inside the evaporator and the other end is connected to a drain pipe which directs the condensate produced by the evaporator to a suitable drainage point inside or, more often, outside the building.

The interior lineset stubs, which are supplied with the evaporator, consist of two stubs of slightly different lengths, usually around 10-12 inches, each of which is a different diameter, and terminates in a flare fitting to facilitate easy connection to the exterior lineset.

All evaporators include an electrical terminal block which is accessed via a removable cover plate. The evaporator is supplied without any electrical cable and this is normally supplied by the installer and connects the evaporator to the condenser, outside the building.

The standard method of installation requires a hole of approximately 3 inches in diameter to be drilled through the wall at the back of the evaporator and for the flexible insulated condensate drain hose and the two short lineset stubs to be inserted through this hole to the exterior of the building where the condenser, which is the other component of the air conditioning system, is situated. The lineset stubs which now extend outside the building, are then connected to a longer length of lineset, sufficient to reach the condenser, and these, together with the cable, are then connected into the condenser while the drain hose is connected into a drainpipe which directs the condensate drainage away from the building. The other end of the electrical cable is then inserted, from the exterior, through the wall sleeve into the interior of the building and into the rear of the body of the evaporator so it can be connected into the terminal block which is usually situated at the front of the evaporator, on one side. The hole which has been drilled through the wall cannot be left unlined as this will permit the ingress of insects, rodents, wind and moisture into the wall cavity which is highly undesirable.

SUMMARY

Common practice is currently to use a plastic pipe stub to line the hole. This only addresses the primary objective of lining the hole, but does not address the very important additional considerations enumerated below.

First, as the thickness of the wall can vary substantially from one installation to another, it is thus desirable to have a sleeve that is variable in length.

Second, a fundamental requirement of any air conditioning system, is that the condensate drain system, which operates by gravity, must incorporate a positive slope away from the drain pan inside the evaporator to ensure that adequate condensate drainage takes place continuously, and wall hung Minisplit units are no different in this respect. It is therefore vital that the flexible drain hose from the unit maintains a positive slope away from the unit as the hose goes through the wall as the condensate will not be able to flow if the slope is either neutral or negative. It is very common for the installers to tape the drain hose together with the lineset and cable into a bundle to facilitate the insertion into the hole in the wall and, in many instances, the lineset, which is semi-rigid copper, and does not require any slope at all, is installed with a negative slope, forcing the drain hose which is taped to it to conform to the negative sloping and thus preventing the flow of condensate.

This requirement has become so fundamental to the installation of wall hung units that most of the manufacturers include in their installation manual a requirement for a 5° slope in the condensate drain hose from the point where the hose exits the evaporator until the hose exits through the wall to the exterior of the building. To cater to this requirement, one sleeve manufacturer, Inaba Denko, discloses a wall sleeve which has a built in 5° slope, however in practice, it has been found to be extremely difficult to drill a 3 inch hole in a wall and maintain an accurate 5° slope between the interior and the exterior and for this reason, this product is seldom, if ever used.

In practice, however, it has been far easier for the installer to drill a straight 3 inch hole through the wall, which is relatively easy, and then, to ensure that the drain hose is installed correctly with sufficient slope inside the wall, which requires considerably more attention to detail and is time consuming.

It is therefore very advantageous to have a wall sleeve that incorporates structure ensuring that the drain hose automatically assumes the correct positive slope when it is inserted into the wall sleeve, saving time and hassle for the installer and eliminating the requirement for return visits to the site to remediate condensate drainage problems, which can be inconvenient, time consuming and expensive.

Third, it is also highly advantageous that the wall sleeve is essentially a round tube to the greatest extent possible as this presents the least problem for the installer to create the necessary opening in the interior and exterior wall surfaces by simply using a hole cutter. If the opening required is square or rectangular at both ends, this would entail substantial extra cutting with a sheetrock saw and would be both inconvenient and time consuming. However, if it becomes necessary, due to the configuration of the wall sleeve, that the opening on the interior or exterior wall surface needs to be extended or enlarged to accommodate an irregularly shaped end of the wall sleeve, this can be done fairly quickly with a minimum of mess and inconvenience.

The installation of the cable presents another set of problems, in that it must be inserted into the wall sleeve from the exterior of the building, and this requires two people, one to feed it in from the outside and the other to guide it into the correct entry opening in the evaporator so that it will emerge in the correct proximity to the terminal block, and then to pull it through so there is enough slack to make the necessary electrical connection. This method presents a second problem, specifically, because the weight of the cable is usually quite substantial, the cable's weight tends to pull the cable back out of the sleeve, and it is usually necessary to have one of the workers hold it in place until it can be secured to the inside unit.

It therefore makes sense to have a cable gripper device attached to the sleeve which would allow the installer to secure the cable to the sleeve once he had inserted it, and this would now enable the entire installation to be done by one person instead of two people. It is also important that this gripper device incorporates a quick release mechanism so, in the event of the evaporator, or the cable, having to be removed for repairs or replacement, the cable can easily be removed and replaced by one person. It is also important for the whole sleeve assembly to be firmly anchored to the wall structure so that the weight of the cable cannot pull the assembly out of the wall.

Fourth, it is important that the open end of the sleeve is protected from the weather so that wind and wind driven rain are not permitted to enter the building and, for this purpose, a mounting plate should be included which will incorporate a weather hood to shield the open end of the sleeve. This hood should be removable, firstly to facilitate installation of the lineset, cable, hose etc. Secondly, if the installer intends to use an external plastic or metal lineset enclosure to hide and protect the lineset as it runs along the exterior wall surface, this hood can either be omitted during installation, or subsequently removed, so that the base plate can then be used as a mounting base for the wall inlet fitting of the lineset enclosure system.

The embodiments described below address the issues outlined above. According to embodiments, an assembly for mounting in a wall includes a first tube having a flange at a first end of the first tube, the flange to be secured against an inner wall panel, a first hose-guide adjacent the first end of the first tube; a second tube having a faceplate flange attached to a second end of the second tube, the faceplate flange to be secured against an outer wall panel, a second hose-guide adjacent the second end of the second tube; and a hood attachable to an outer side of the faceplate flange. A first distance between the first hose-guide and an inner periphery of the first tube is greater than a second distance between the second hose-guide and an inner periphery of the second tube so that a hose guided by the hose-guides slopes downwardly as it exits the building through the wall.

DETAILED DESCRIPTION OF EMBODIMENTS

Figure 1:
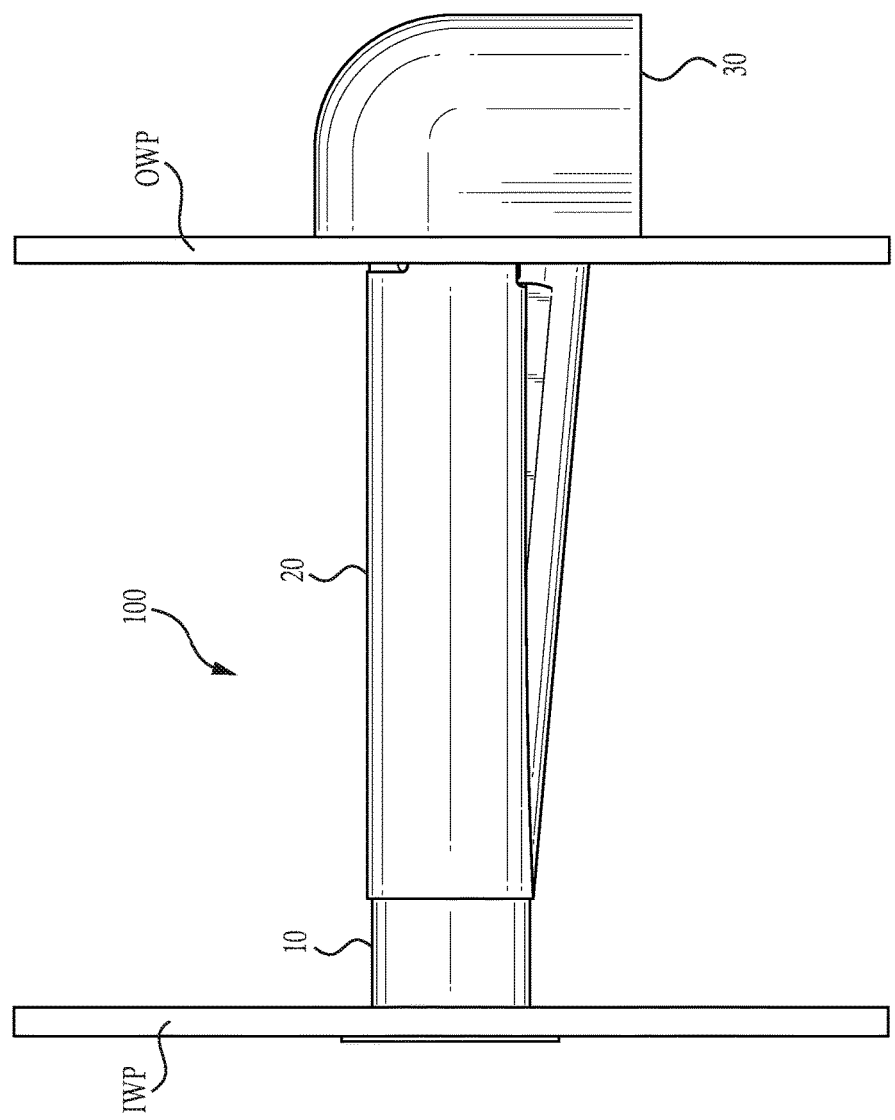
FIG. 1 is a side view of a wall-mounted sleeve assembly according to a first embodiment.

FIG. 1 is a side view of a wall-mounted sleeve assembly 100 according to a first embodiment. FIG. 1 shows the sleeve assembly 100 attached to and extending through a wall having an inner wall panel IWP and an outer wall panel OWP. The assembly 100 includes a first (inner) tube 10 that is inserted through a hole that is formed in the inner wall panel IWP and a second (outer) tube 20 that is inserted through a hole formed in the outer wall panel OWP. An external hood 30 is disposed on the outside of the outer wall panel OWP to protect the lineset, condensate tubing and electrical cable that exits through the outer tube 20 for connection to the external portion of the air-conditioning system. The hood 30 also prevents the ingress of rain and wind into the assembly 100.

Figure 2:
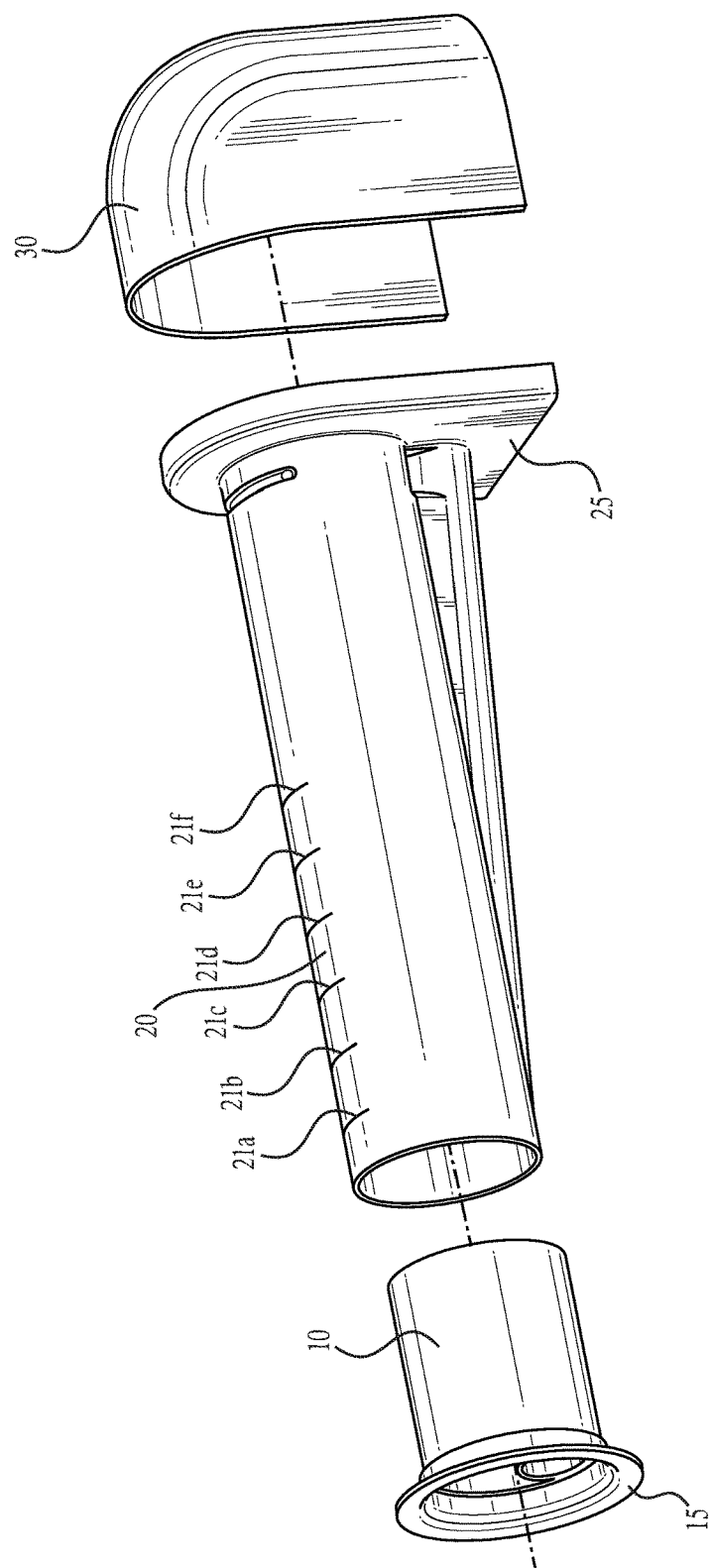
FIG. 2 is a perspective view of the wall-mounted sleeve assembly in an exploded state.
Figure 3:
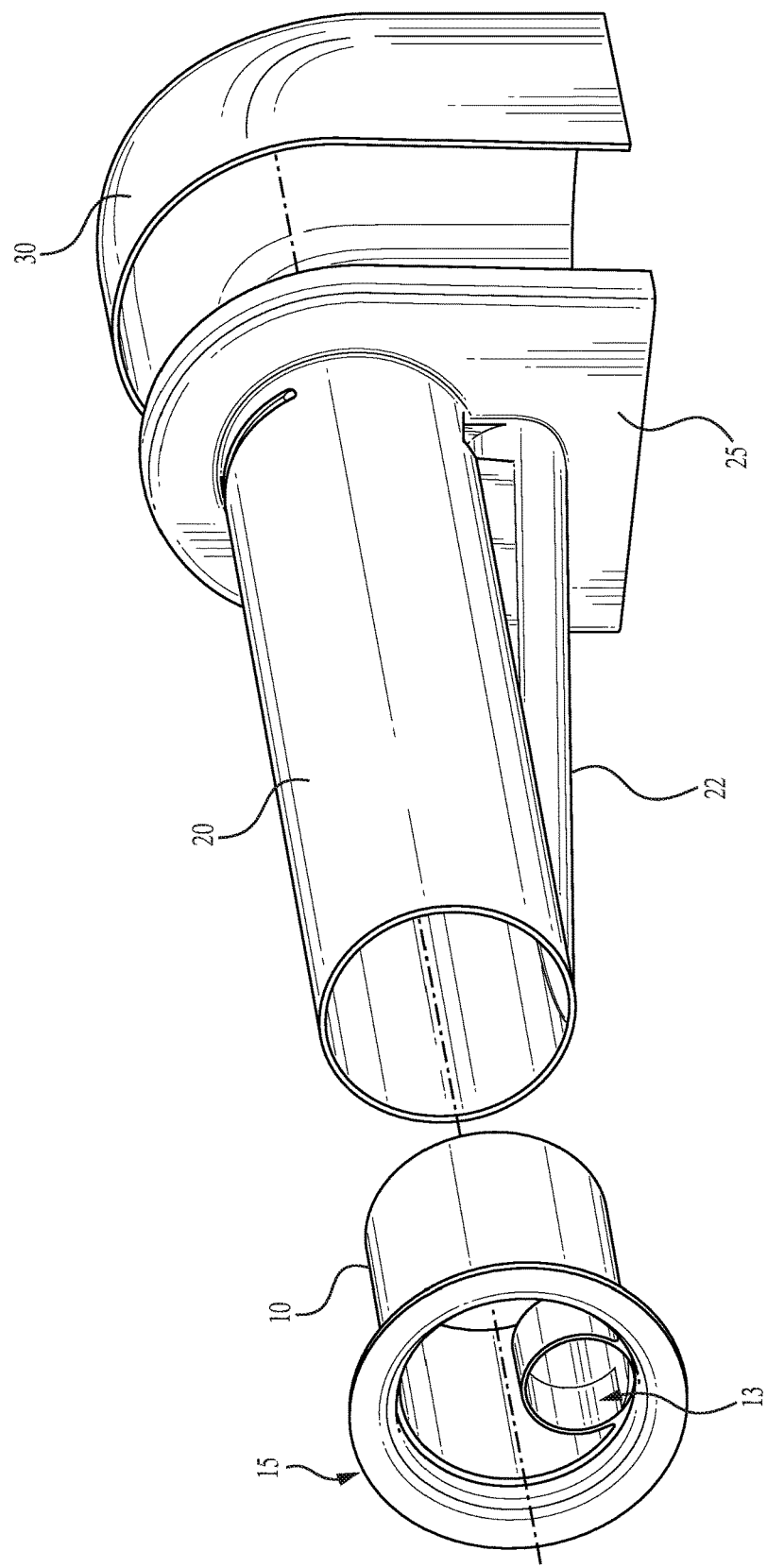
FIG. 3 is a perspective view of the wall-mounted sleeve assembly and further shows a conduit holder/guide within a first (inner-side) tube of the assembly.

Referring to FIG. 2 and FIG. 3, the inner tube 10 can have a length of, for example, 2 inches and an inner diameter of, for example, 2.5 inches, although other sizes are possible. The inner tube 10 can be made from metal, plastic, fiberglass composite or any other material or any combination of the above. In the preferred embodiment, the inner tube 10 is round, although other shapes such a square, rectangular, etc. can be used. In addition, the shape of the inner tube 10 can be the same throughout or can very along its length. The tube 10 can have different diameters along its length if desired. The tube 10, as well as the other components of the assembly 100, can be extruded, fabricated, blow-molded, injection-molded, or vacuum-molded, for example.

Inner tube 10 has a flange 15 at a first end thereof, which is the end that terminates at the inner wall panel IWP of the building. The flange 15 prevents the inner tube 10 from being pulled through the wall from the exterior of the building, for example. The flange 15 can be round, square, rectangular or any other geometric shape suitable for the particular installation. The flange 15 can be integrally molded with the inner tube 10, or the flange 15 can be a separate piece that is attached to the inner tube 10 after the inner tube 10 has been fitted into the wall.

The flange 15 preferably incorporates a raised sill, which may simply be a flat surface or may be a shaped orifice or partial orifice at the bottom of the opening on the interior wall. In the illustrated embodiment, a ring-shaped conduit holder/guide 13 is provided at the lower portion of the opening of the flange 15. The condensate drain hose of the air conditioning unit will be passed through the conduit holder/guide 13. The conduit holder/guide 13 ensures that the condensate drain hose from the air-conditioner enters the assembly 100 at a slightly higher position so that it will have to slope downward as the condensate drain hose extends through the assembly 100 toward the outside end of the assembly 100.

The flange 15 also can be increased in size on one or more of its sides to allow for one or more secondary smaller tubes (not shown) to pass through it. The secondary tube or tubes can either be molded as part of the larger, inner tube 10 or can be a separate component that is inserted into the larger, inner tube 10 and retained in place by mechanical structure or with adhesives that can be internally or externally attached to the inner tube 10.

The second (outer) tube 20 generally has a greater length and slightly larger diameter than the inner tube 10 so that the flangeless end of the tube 10 can be inserted into the flangeless end of the tube 20 as shown in FIG. 1. The outer tube 20 can be made of the same or different material as the inner tube 10, and can be made by the same or a different process as the inner tube 10. As shown in FIG. 2, it is preferable to include cutting marks 21a-21f on the outer surface of tube 20, for example, at 1 inch intervals, to make it easier for the installer to cut the second tube 20 to the desired length. By providing inner tube 20 with a long length (for example, 12 inches), while enabling the outer tube 20 to be cut so as to shorten its length, the overall system 100 can be used for walls having various thicknesses, for example, between 6 inches and 12 inches.

As shown in FIGS. 2-6, a second flange or faceplate 25 is provided for the end of the second tube 20 that will be located on the exterior of the outer wall panel OWP. The outer tube 20 can include structure by which it can be firmly attached to the faceplate 25. For example, a series of four or more (or less) raised ridges could be provided on the exterior surface of the outer end of tube 20 which would allow the faceplate 25 to attach to the tube 20 by rotating the tube into position and aligning with corresponding notches on the inner circumference of the hole in the exterior faceplate 25 which would mate with the ridges on the tube 20 and securely lock the faceplate 25 to the end of the tube 20.

Attachment of the faceplate 25 to the tube 20 also can be secured by other means including screwing both components together by providing threading on the faceplate 25 and on the tube 20. Alternatively, a series of clip mechanisms or other suitable structure for ensuring that the faceplate 25 is firmly the attached to the tube 20 can be provided.

Alternatively, the faceplate 25 can be integrally molded into the tube 20 (that is, the faceplate 25 and the tube 20 can be formed as a unitary structure).

The faceplate also can incorporate a method of ensuring that the faceplate can only be installed in the correct orientation. The faceplate also can be configured to permit it to be installed in any orientation to allow for those cases where the lineset may have to approach the sleeve from the left side, right side or from above. The faceplate 25 can be formed so as to be easily removed from the tube 20 in case it becomes necessary to remove the assembly 100 from the wall.

Figure 4:
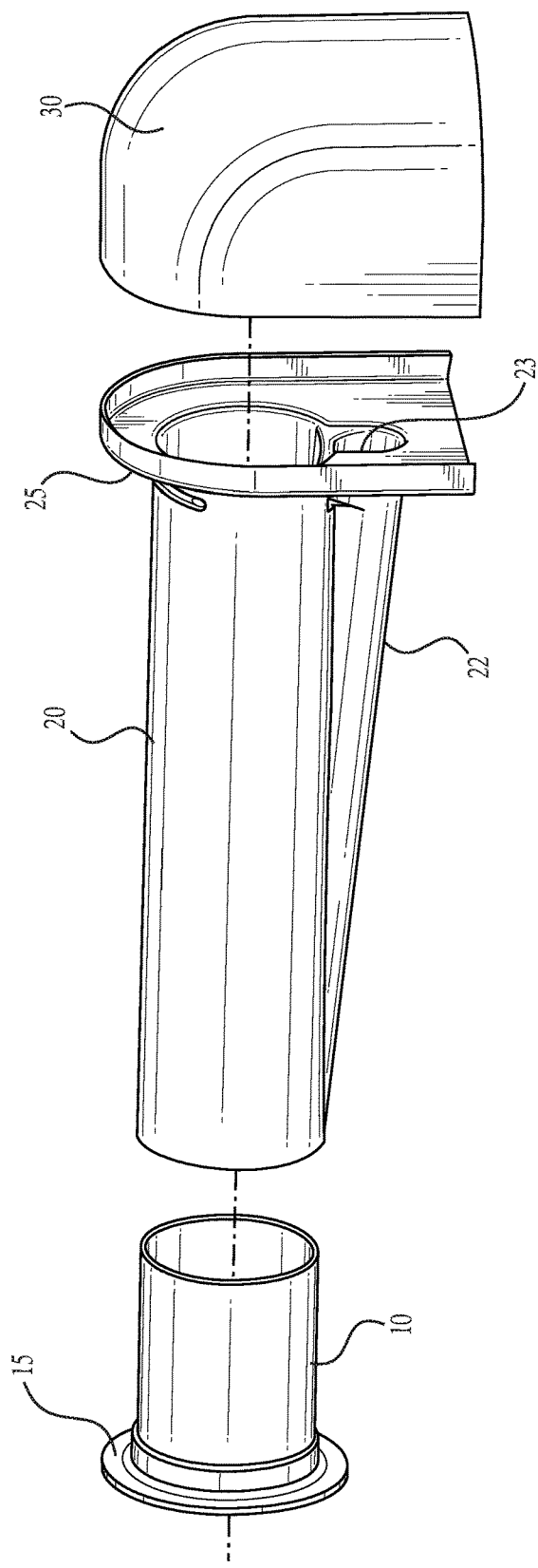
FIG. 4 is a perspective view of the wall-mounted sleeve assembly and further shows a conduit holder/guide within a second (outer-side) tube of the assembly.
Figure 5:
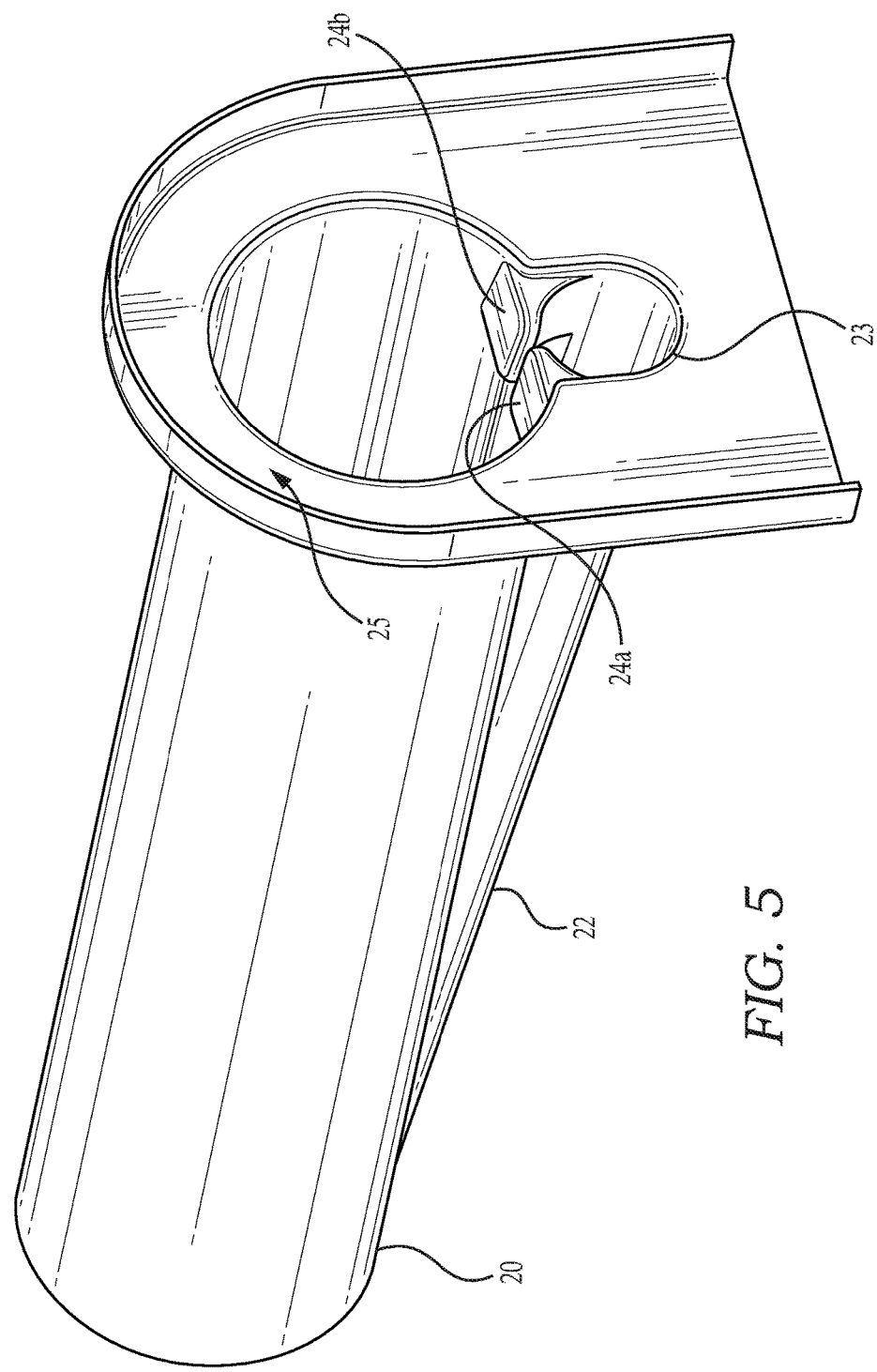
FIG. 5 is a perspective view of the second (outer-side) tube of the assembly and its faceplate flange.
Figure 6:
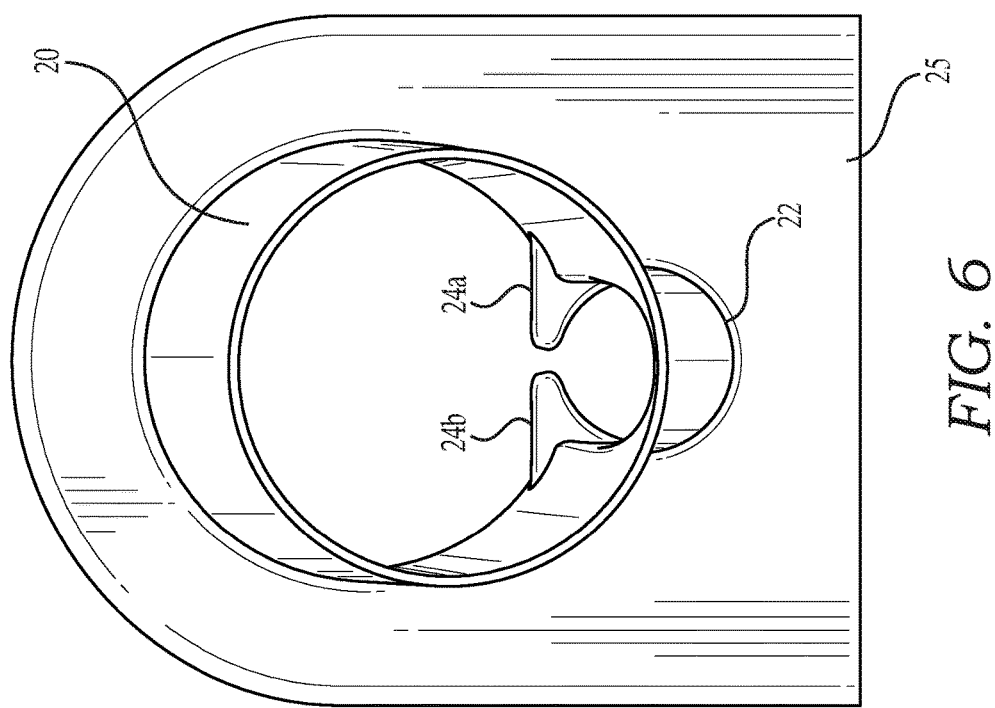
FIG. 6 shows the second (outer-side) tube when viewed from a side thereof that is mounted to the outer wall panel of a wall.

The faceplate 25 also can incorporate a lower sill at the bottom of the opening on the exterior wall. The sill can be a flat surface or it may be a shaped orifice or partial orifice to act as a guide to ensure that the condensate drain hose exits the tube 20 and faceplate 25 at its lowest point. This ensures sufficient slope of the condensate drain hose within the tube 20 to ensure correct drainage. As shown in the illustrated embodiment, a drain hose channel 22 is provided at the lower side of the tube 20. The channel 22 slopes downwardly from the first end of the tube 20, which mates with the inner tube 10, toward the second end of the tube 20, which mates to the flange 25. As shown in FIGS. 4-6, the flange 25 includes a conduit holder 23 that includes upper tabs 24a and 24b. The condensate drain hose will extend through the conduit holder 23 as described above. The lower sill can be configured so that it always faces downward to ensure correct drainage, regardless of the orientation of the faceplate 25.

The exterior faceplate 25 can be square, rectangular, round or any other shape, and can be made from metal, plastic, fiberglass composite or any other material or combination of the above materials.

The faceplate 25 preferably is suitably sized to ensure that if it is desired to install a system of plastic or metal lineset covers to protect and beautify the lineset on the exterior wall, faceplate 25 will provide sufficient space and a stable surface for the wall inlet fitting of the lineset cover system to be attached to it at the point where the lineset exits from the exterior wall.

The faceplate 25 also can include structure for securing the cable to the faceplate once the cable has been inserted into the tubes 10 and 20. The cable securing mechanism can be a metal or plastic device that is either incorporated into the body of the faceplate 25 or into the tube 20, or it can be added as an extra component.

The faceplate 25 is connected to a removable hood 30 that prevents rain and wind from entering the open end of the tube 20. The hood 30 can be square, rectangular, round or any other shape, and can be made from metal, plastic, fiberglass composite or any other material or combination of the above materials. The hood 30 can be extruded, fabricated, blow-molded, injection-molded or vacuum-molded, for example.

The hood 30 can be securely attached to the faceplate with screws or with clips that can be molded into the hood 30 and will clip into suitably sized slots molded into the faceplate to enable it to be easily attached or removed and replaced if necessary.

The entire assembly 100, or any part of it, can be produced in any color that matches the exterior decor of the building.

The faceplate 25 may have a specially shaped rear surface to conform with any irregular surface found with wood, metal or plastic siding material or any other type of wall facing material to which the faceplate 25 is mounted.

The faceplate 25 may incorporate a strip of flexible rubber or foam gasket around its edges, or it may be covered with a layer of a flexible rubber or foam gasket material on its building-facing side to ensure a weatherproof joint between the rear of the faceplate 25 and the outer wall panel OWP of the building.

The exterior faceplate 25 also can incorporate formed U-shaped edges that would act as a flashing cover for the ends of the siding and enable the faceplate 25 to be framed into a new or existing siding if desired.

Figure 7:
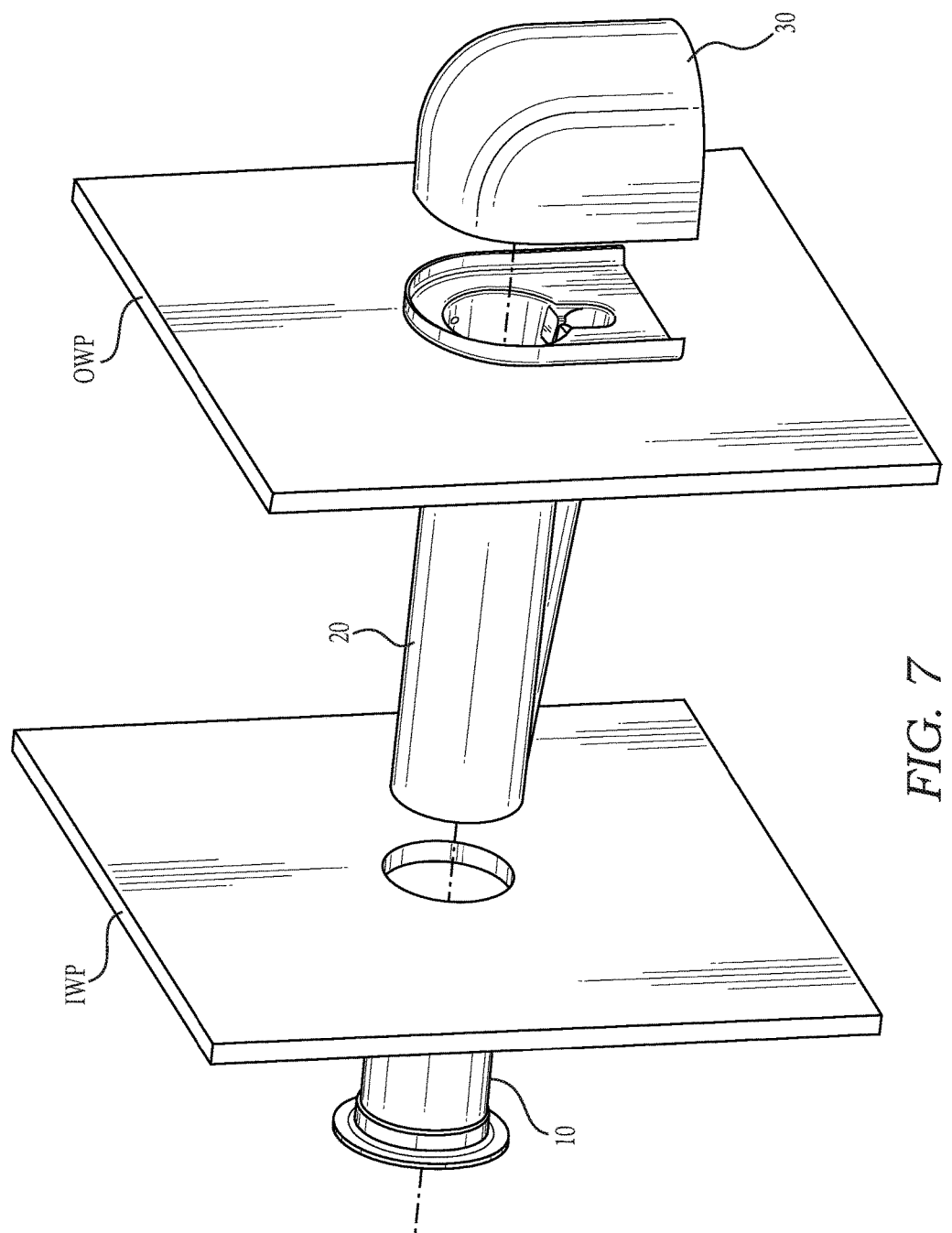
FIG. 7 is a perspective view of the wall-mounted sleeve assembly from an outer-wall side showing how its components are to be mounted to a wall of a building.
Figure 8:
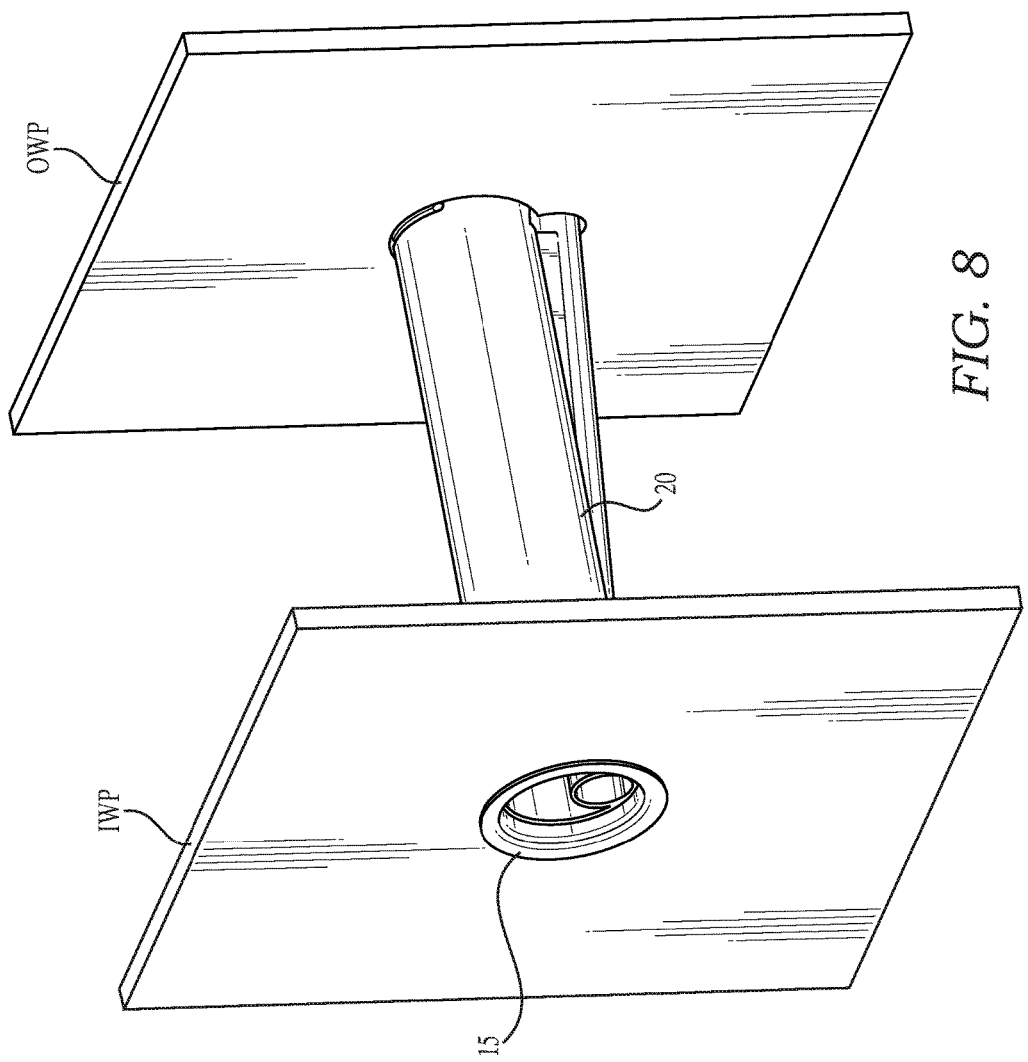
FIG. 8 is a perspective view of the wall-mounted sleeve assembly from an inner-wall side showing the assembly after being mounted to a wall of a building.

Installation of the assembly can be understood with reference to FIGS. 7 and 8. To install the assembly, a hole, for example, a circular hole, is cut through the building wall, including the inner wall panel IWP and the outer wall panel OWP. The same size hole can be formed in each of the panels IWP and OWP. The lower portion of the hole in the outer wall panel OWP is made larger, for example, by cutting a notch at the lower end of the hole, to accommodate the drain hose channel 22 of the outer tube 20 and to accommodate the conduit holder/guide 23 of the faceplate flange 25. The installer determines whether the length of the outer tube 20 needs to be shortened based on the distance between the inner wall panel IWP and the outer wall panel OWP (that is, based on the thickness of the wall). The outer tube 20 then is cut if necessary.

The tube 20 and its faceplate flange 25 are installed from the outside of the building. Faceplate flange 25 is attached to tube 20 if they have not been attached to each other before installation. The faceplate flange 25 can be attached to the outer wall panel OWP, for example, with screws if desired. The inner tube 10 and its flange 15 are installed from the inside of the building. During the installation process, the outer tube 20 and the faceplate flange 25 are oriented so that the drain hose channel 22 and the conduit holder/guide 23 are at the lower side of the tube 20 and flange 25. Similarly, the flange 15 is oriented so that the conduit holder/guide 13 is at the lower side of the flange 15.

The free (flangeless) end of the tube 10 is inserted into the free (flangeless) end of the tube 20. The condensate drain hose of the air conditioner unit is then passed through the assembly, that is, through the conduit holder/guide 13, the drain hose channel 22 and the conduit holder/guide 23, which ensure that the condensate drain hose will have a sufficient downward pitch. The lineset can be passed through the assembly from the inside, and the electric cable can be passed through the assembly from the outside. All components of the air conditioner then can be attached together as usual. The hood 30 then is attached to the faceplate flange 25.

The embodiment described above can be modified as described below. The flange 15 can incorporate a second full or partial orifice through which an electrical cable can be inserted from the outside of the building to make the electrical connection into the evaporator. The orifice can be funnel shaped on the side facing the exterior to act as a guide to facilitate the entry of the cable when it is inserted from the exterior of the building. The orifice can have a connector which can be plain or barbed on the side facing the interior of the building to permit the attachment of a short length of flexible hose or a flexible sleeve to guide the cable directly into the cable entry orifice on the rear of the evaporator. The hose or sleeve can be plain or corrugated from any flexible material, or any combination of these, and can be configured so as to create a slight elbow at the end which protrudes into the cable entry orifice to ensure that the cable will enter the orifice at the right angle to facilitate it sliding easily into the cable guide channel inside the evaporator. The hose or sleeve can be assembled from fabricated components or can be molded as one complete assembly and can incorporate a locking mechanism to enable it to be quickly and easily attached to the cable entry orifice and can be adjustable to enable it to attach to different size orifices. Alternatively, the end where the hose or sleeve attaches to the cable entry orifice can be a plain straight cut and an adaptor to enable it to be connected into the cable entry orifice can be supplied as a separate optional component. Alternatively, the hose, instead of traversing only the distance between the inner wall flange 15 and the cable attachment point on the evaporator, can run the full length of the assembly (both tubes 10 and 20) to expedite the insertion of the cable from the exterior. The hose can be lengthened or shortened as required by unclipping it from the positioning clips inside the tube and repositioning it. Alternatively, if it is necessary to shorten the hose between the interior wall plate and the cable entry point on the evaporator, this can be done by removing the adaptor, cutting the hose to the required length and replacing the adaptor. The adaptor, on the end which mates with the cable entry orifice, can incorporate a locking mechanism which enable it to be quickly and easily attached to the cable entry orifice and can be adjustable to enable it to attach to different size orifices. The adaptor can be so configured as to provide a slight angle at the point where it protrudes from the cable entry orifice to ensure that when the cable is inserted from the exterior, it will enter the cable entry orifice at the correct angle to ensure that it can pass through the cable guide inside the evaporator without obstruction.

A second, preferred embodiment now will be described in connection with FIGS. 9-14. The second embodiment is generally similar to the first embodiment except that the second embodiment has a second (outer-side) tube that has a constant diameter. That is, the second tube of the second embodiment does not have a downwardly-extending condensate drain hose holding channel. The second embodiment, nonetheless, includes structure to ensure that the condensate drain hose will be held within the assembly at a desired downward pitch. A benefit of the second embodiment is that the hole to be formed in the outer wall panel OWP of the building does not require formation of a notch to accommodate the downward extending channel of the second tube. It can be difficult to cut out such a notch particularly when the outer wall panel OWP of the building is formed of bricks, concrete, cinder blocks or some other difficult to cut material. A single circular cutting device can be used to cut the holes in each of the inner and outer wall panels IWP and OWP, and no additional cutting is needed. In this embodiment, if the outer faceplate flange is formed separately from the second (outer) tube, it is possible to insert the entire assembly (except for the outer faceplate flange) from inside the building in the second embodiment because the second tube has a constant diameter. On the other hand, if the second embodiment is made by injection molding (instead of blow molding for example), the outer faceplate flange can be formed unitarily (as one piece) with the second (outer) tube, in which case the inner tube would be installed from inside of the building and the outer tube would be installed from outside of the building as in the first embodiment. An advantage of forming the wall-mounted sleeve assembly by injection molding is that the total number of parts can be reduced, which reduces costs associated with assembling the wall-mounted sleeve assembly.

Figure 9:
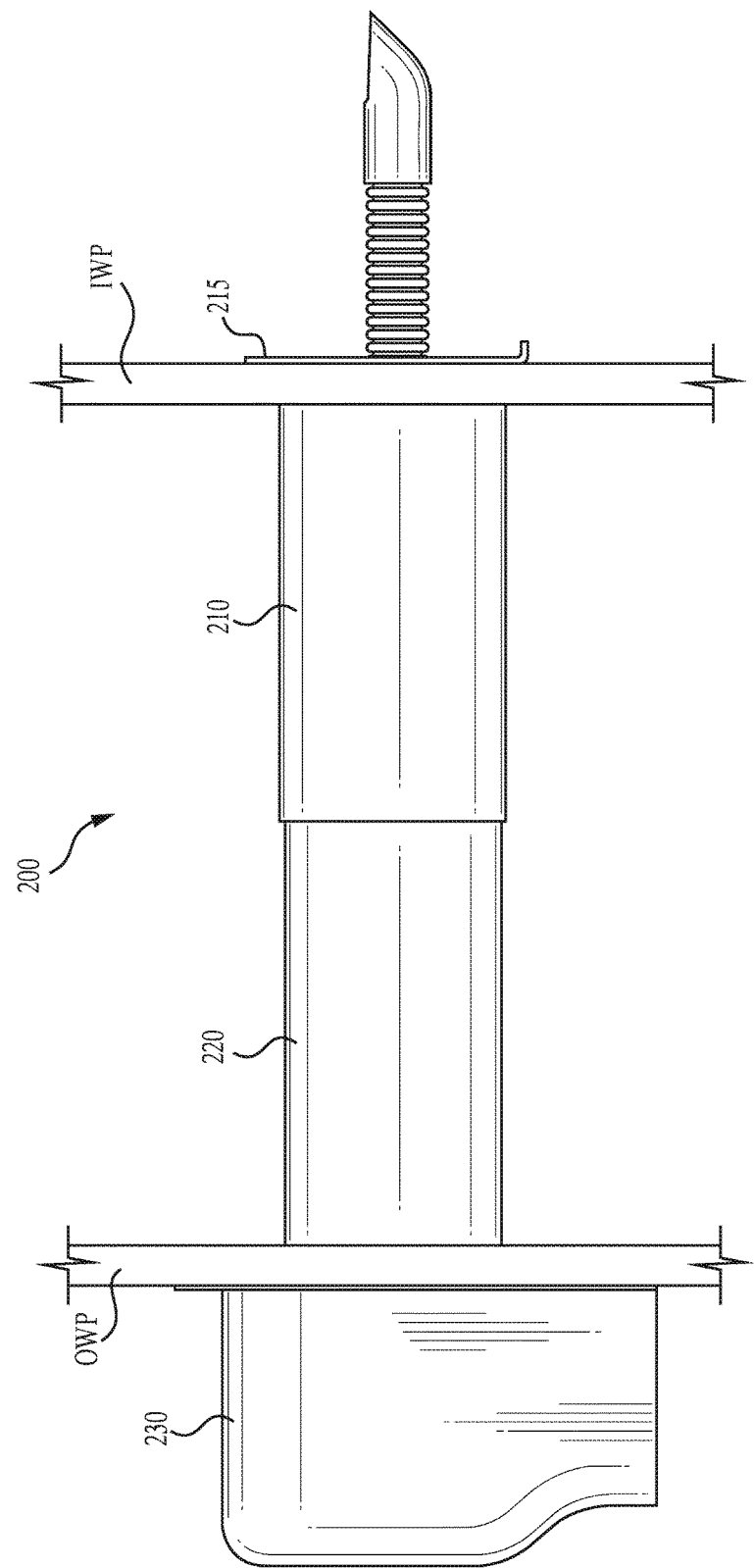
FIG. 9 is a side view of a wall-mounted sleeve assembly according to a second, preferred embodiment.

FIG. 9 is a side view of a wall-mounted sleeve assembly 200 according to the second embodiment. FIG. 9 shows the sleeve assembly 200 attached to and extending through a wall having an inner wall panel IWP and an outer wall panel OWP. The assembly 200 includes a first (inner) tube 210 that is inserted through a hole that is formed in the inner wall panel IWP and a second (outer) tube 220 that is inserted through a hole formed in the outer wall panel OWP. An external hood 230 is disposed on the outside of the outer wall panel OWP to protect the lineset, condensate tubing and electrical cable that exits through the outer tube 220 for connection to the external portion of the air-conditioning system. The hood 230 also prevents the ingress of rain and wind into the assembly 200.

Figure 10:
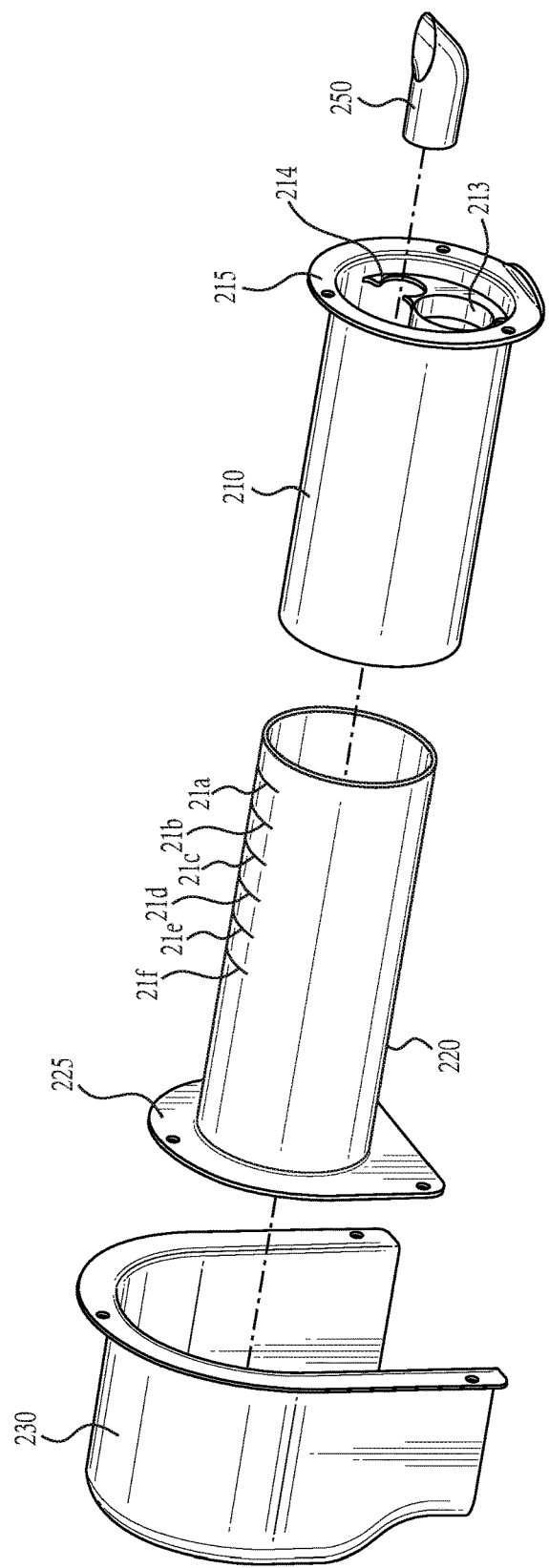
FIG. 10 is a perspective view of the second embodiment wall-mounted sleeve assembly in an exploded state.
Figures 11A, 11B:
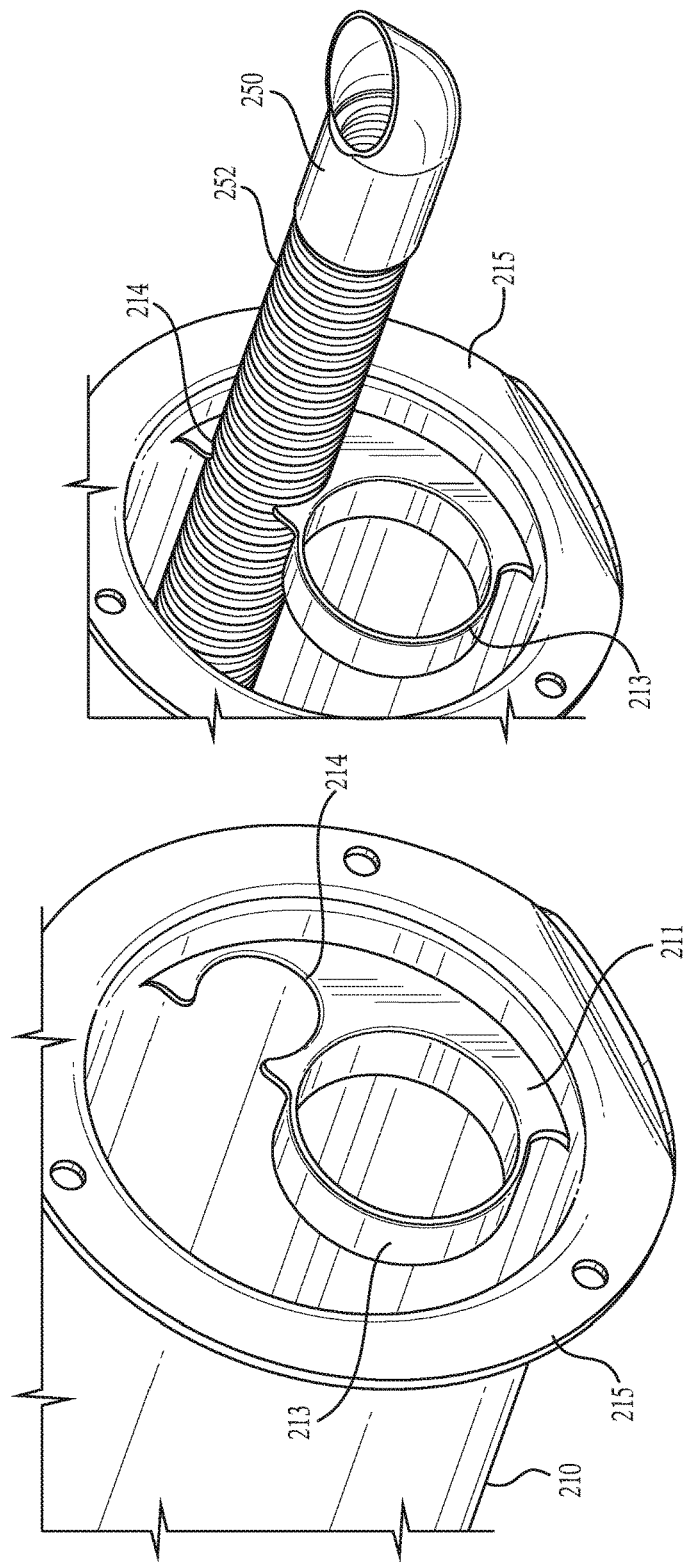
FIGS. 11A and 11B are perspective end views (as viewed from within the building) of the flange and first (inner-side) tube of the second embodiment assembly, and further show a conduit holder/guide and an electrical cable holder/guide within the first (inner-side) tube of the assembly, FIG. 11B showing an electrical cable guiding sleeve held by the electrical cable holder/guide.

Referring to FIG. 10, FIG. 11A and FIG. 11B, the inner tube 210 can have a length of, for example, 2 inches and an inner diameter of, for example, 2.5 inches, although other sizes are possible. For example, the inner tube 210 could have a length of 5 inches or more and a diameter of 3 inches, 3.5 inches, 4 inches or more. The inner tube 210 can be made from metal, plastic, fiberglass composite or any other material or any combination of the above. In the preferred embodiment, the inner tube 210 is round, although other shapes such a square, rectangular, etc. can be used. In addition, the shape of the inner tube 210 can be the same throughout or can very along its length. The tube 210, as well as the other components of the assembly 200, can be extruded, fabricated, blow-molded, injection-molded, or vacuum-molded, for example. In a preferred embodiment, the inner tube 210 is injected molded plastic.

Inner tube 210 has a flange 215 at a first end thereof, which is the end that terminates at the inner wall panel IWP of the building. The flange 215 prevents the inner tube 210 from being pulled through the wall from the exterior of the building, for example. The flange 215 can be round, square, rectangular or any other geometric shape suitable for the particular installation. The flange 215 can be integrally molded with the inner tube 210, or the flange 215 can be a separate piece that is attached to the inner tube 210 after the inner tube 210 has been fitted into the wall.

The flange 215 incorporates a raised sill 211 having a height of, for example, ⅜ inch. The raised sill 211 helps to ensure that the more upstream end of the condensate drain hose will be held at a vertically higher position than the more downstream end of the drain hose that exits the second tube 220 (to be described below). Preferably the sill 211 includes structure to securely hold the drain hose in position on the sill 211. As illustrated in FIGS. 11A and 11B, a ring-shaped conduit holder/guide 213 is provided on the sill 211. Preferably the sill 211 and the conduit holder/guide 213 are provided at the lower portion of the opening of the flange 215. Forming the sill 211 and conduit holder/guide 213 on the flange 215 as opposed to the first tube 210 allows for standard tubing to be used for the first tube if the tube 210 and the flange 215 are formed as separate parts. The condensate drain hose of the air conditioning unit will be passed through the conduit holder/guide 213. The conduit holder/guide 213 ensures that the condensate drain hose from the air-conditioner enters the assembly 200 at a slightly higher position so that it will have to slope downward as the condensate drain hose extends through the assembly 200 toward the outside end of the assembly 200.

As shown in FIGS. 11A and 11B, an electrical cable holder or guide 214 also can be provided on the sill 211. In addition, a flexible hose having a corrugated part 252 and an end part 250 can be held by the electrical cable holder/guide 214. The electrical cable holder/guide 214 is a C-shaped member, although it could be an O-shaped orifice or have other shapes. As will be described below, an electrical cable 260 (see FIG. 14) will passed through the flexible hose from outside the building after the assembly has been mounted to the wall, and the end part 250 has a sideward-projecting end opening that directs the electrical cable in a desired direction toward the indoor unit of the air conditioning unit.

In a preferred embodiment, the inner tube 210, the flange 215 including the sill 211, the conduit holder/guide 213 and the electrical cable holder/guide 214 are injection-molded plastic as one a one-piece (unitary) member. The flexible hose 250, 252 can be provided pre-assembled to the electrical cable holder/guide 214.

Figure 13:
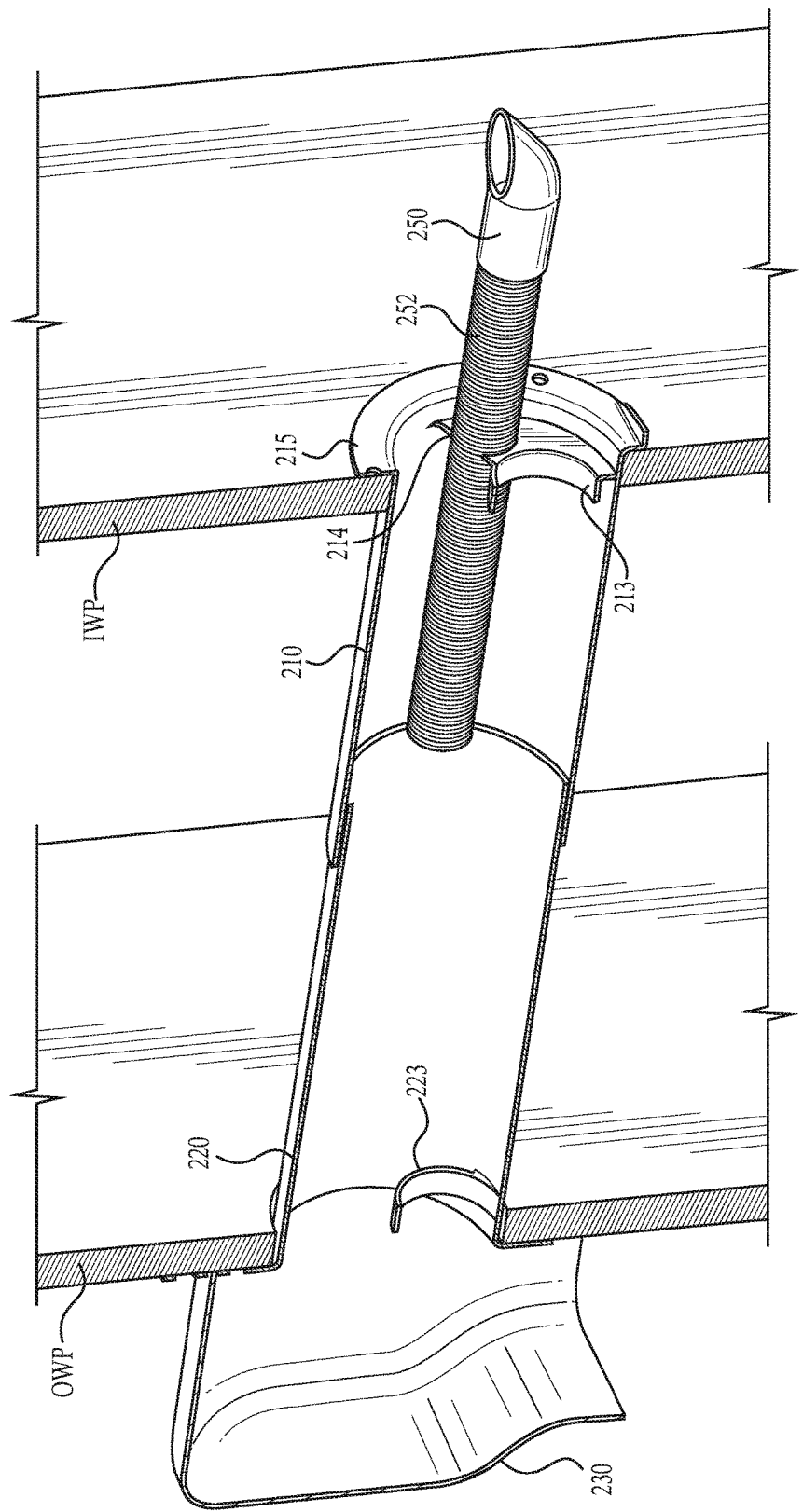
FIG. 13 is a perspective sectional view of the wall-mounted sleeve assembly mounted in a wall of a building, with the electrical cable guiding sleeve held by the electrical cable holder/guide.
Figure 14:
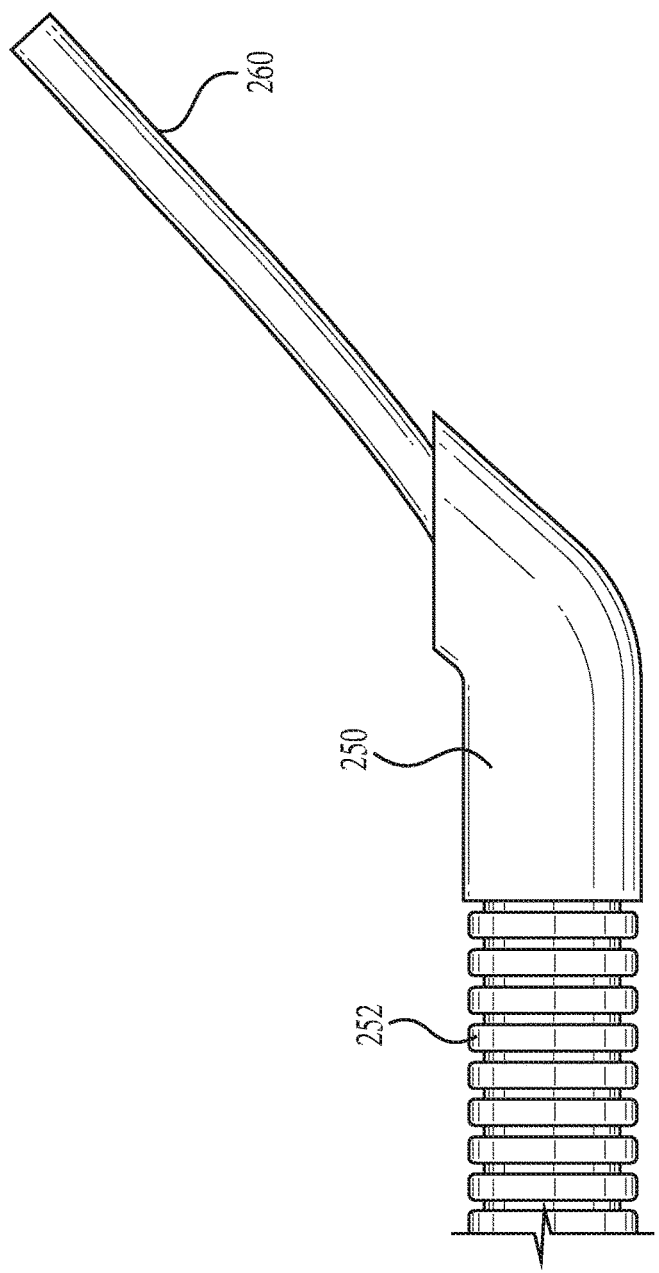
FIG. 14 is a side view of the electrical cable guiding sleeve with an electrical cable passing through it.

The second (outer) tube 220 generally has a greater length and slightly smaller diameter than the inner tube 210 so that the flangeless end of the tube 220 can be inserted into the flangeless end of the tube 210 as shown in FIGS. 9 and 13.

The outer tube 220 can be made of the same or different material as the inner tube 210, and can be made by the same or a different process as the inner tube 210. As shown in FIG. 10, it is preferable to include cutting marks 21a-21f on the outer surface of tube 220, for example, at 1 inch intervals, to make it easier for the installer to cut the second tube 220 to the desired length. By providing inner tube 220 with a long length (for example, 12 inches), while enabling the outer tube 220 to be cut so as to shorten its length, the overall system 200 can be used for walls having various thicknesses, for example, between 6 inches and 12 inches.

It also is contemplated that the inner tube 210 can have a smaller diameter than the outer tube 220 so that the flangeless end of the inner tube 210 is inserted into the flangeless end of the outer tube 220. Also, the inner tube 210 can be the longer tube that is provided with the cutting marks 21a-21f.

Figure 12:
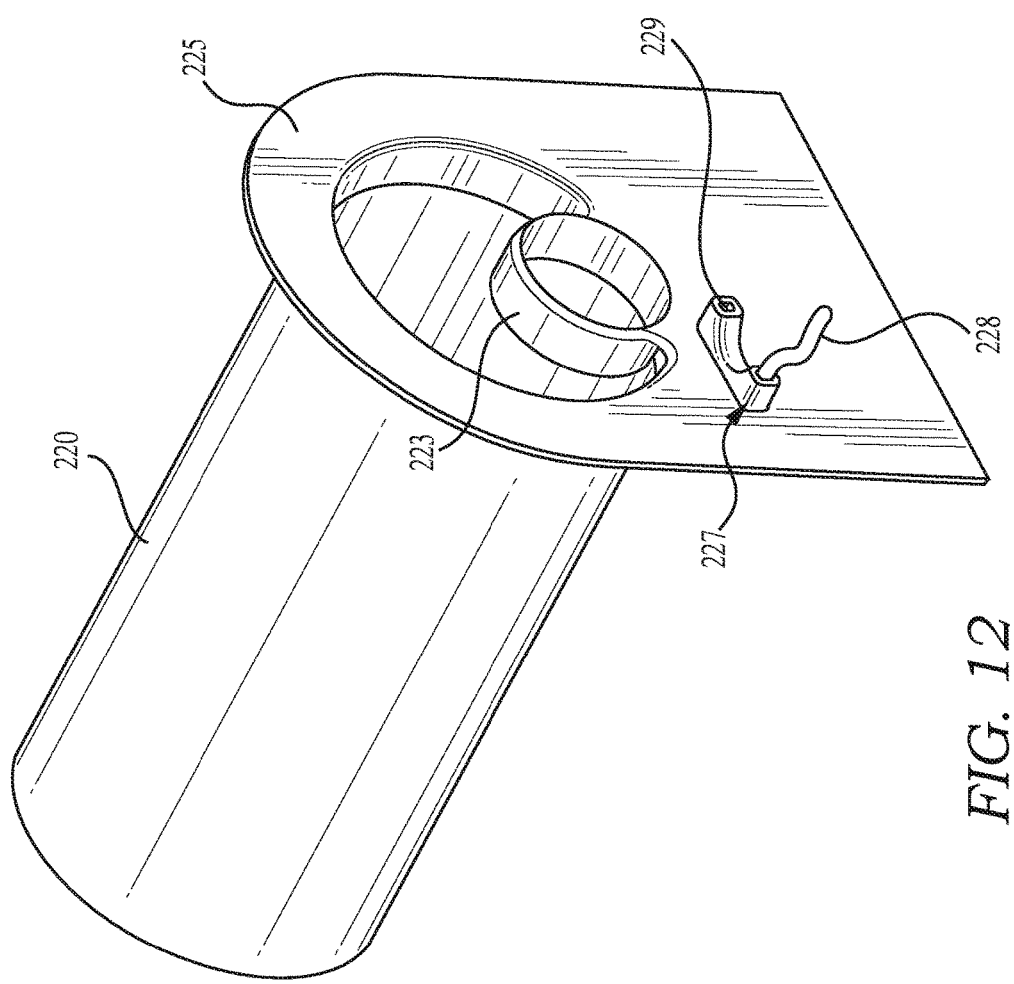
FIG. 12 is a perspective end view (as viewed from outside of the building) of the faceplate flange and second (outer-side) tube of the second embodiment assembly, and further shows a conduit holder/guide within the second (outer-side) tube of the assembly and an electrical cable securing mechanism provided on the faceplate flange.

As shown in FIGS. 10 and 12, a second flange or faceplate 225 is provided for the end of the second tube 220 that will be located on the exterior of the outer wall panel OWP. The outer tube 220 can include structure by which it can be firmly attached to the faceplate 225. For example, a series of four or more (or less) raised ridges could be provided on the exterior surface of the outer end of tube 220 which would allow the faceplate 225 to attach to the tube 220 by rotating the tube into position and aligning with corresponding notches on the inner circumference of the hole in the exterior faceplate 225 which would mate with the ridges on the tube 220 and securely lock the faceplate 225 to the end of the tube 220.

Attachment of the faceplate 225 to the tube 220 also can be secured by other means including screwing both components together by providing threading on the faceplate 225 and on the tube 220. Alternatively, a series of clip mechanisms or other suitable structure for ensuring that the faceplate 225 is firmly the attached to the tube 220 can be provided.

Alternatively, the faceplate 225 can be integrally molded with the tube 220 (that is, the faceplate 225 and the tube 220 can be formed as a unitary structure). In a preferred embodiment, the outer tube 220 and the flange 225 are formed as one piece by injection molding.

The faceplate 225 also can incorporate a method of ensuring that the faceplate 225 can only be installed in the correct orientation. The faceplate 225 can be formed so as to be easily removed from the tube 220 in case it becomes necessary to remove the assembly 200 from the wall.

The faceplate 225 also can incorporate a conduit holder 223 at the bottom of the opening on the exterior wall. The conduit holder 223 is located closer to (for example, at the same level as) the wall of the outer tube 220 than the conduit holder/guide 213 of the inner tube 210 because there is no sill (like sill 211), or there is a smaller sill, provided between the conduit holder 223 and faceplate 225. This ensures that the condensate drain hose exits the tube 220 and faceplate 225 at its lowest point. Thus, a distance (first distance) between the conduit holder/guide 213 and the surface of the inner tube 210 is greater than a distance (second distance) between the conduit holder 223 and the surface of the outer tube 220. This ensures sufficient slope of the condensate drain hose within the assembly 200 to ensure correct drainage. The condensate drain hose will extend through the conduit holder 223 as described above.

The exterior faceplate 225 can be square, rectangular, round or any other shape, and can be made from metal, plastic, fiberglass composite or any other material or combination of the above materials.

The faceplate 225 preferably is suitably sized to ensure that if it is desired to install a system of plastic or metal lineset covers to protect and beautify the lineset on the exterior wall, faceplate 225 will provide sufficient space and a stable surface for the wall inlet fitting of the lineset cover system to be attached to it at the point where the lineset exits from the exterior wall.

The faceplate 225 also can include structure for securing the electrical cable to the faceplate 225 once the electrical cable has been inserted into the tubes 210 and 220. The cable securing mechanism can be a metal or plastic device that is either incorporated into the body of the faceplate 225 or into the tube 220, or it can be added as an extra component. In the embodiment shown in FIG. 12, the cable securing mechanism is a cable tie 227 having a base attached to the faceplate 225, a strap 228 and a locking aperture 229 into which the free end of the strap 228 is inserted and locked after the strap is wrapped around the electrical cable.

In a preferred embodiment, the outer tube 220, the flange 225 including the conduit holder 223 and the cable tie 227 are injection-molded plastic as one a one-piece (unitary) member.

The faceplate 225 is connected to a removable hood 230 that prevents rain and wind from entering the open end of the tube 220. The hood 230 can be square, rectangular, round or any other shape, and can be made from metal, plastic, fiberglass composite or any other material or combination of the above materials. The hood 230 can be extruded, fabricated, blow-molded, injection-molded or vacuum-molded, for example.

The hood 230 can be securely attached to the faceplate with screws or with clips that can be molded into the hood 230 and will clip into suitably sized slots molded into the faceplate to enable it to be easily attached or removed and replaced if necessary.

The entire assembly 200, or any part of it, can be produced in any color that matches the exterior decor of the building.

The faceplate 225 may have a specially shaped rear surface to conform with any irregular surface found with wood, metal or plastic siding material or any other type of wall facing material to which the faceplate 225 is mounted.

The faceplate 225 may incorporate a strip of flexible rubber or foam gasket around its edges, or it may be covered with a layer of a flexible rubber or foam gasket material on its building-facing side to ensure a weatherproof joint between the rear of the faceplate 225 and the outer wall panel OWP of the building.

The exterior faceplate 225 also can incorporate formed U-shaped edges that would act as a flashing cover for the ends of the siding and enable the faceplate 225 to be framed into a new or existing siding if desired.

Installation of the assembly 200 now will be described. The assembly 200 can be installed in a way similar to the first embodiment. Alternatively, the assembly 220 can be installed in a different way described below.

A metal bracket provided by the manufacturer of the evaporator of the air conditioner is attached to the interior wall panel IWP in the desired position for the evaporator. To install the assembly, a circular hole, the precise position of which is determined by a designated space on the metal bracket, is cut through the building wall, including the inner wall panel IWP and the outer wall panel OWP. The same size hole can be formed in each of the panels IWP and OWP.

The inside flange 215 of the assembly 200, which incorporates holder/guide 213 for the condensate drain hose as well as the electrical cable holder/guide 214 for the electrical cable and into which the flexible hose 250/252 is inserted, is pushed down onto the protruding lineset/drain hose bundle at the rear of the evaporator, ensuring that the drain hose passes through the orifice of the holder/guide 213 intended for it. Prior to pushing the flange 215 flat onto the rear surface of the evaporator, the short stub 250 of flexible hose which is attached to the holder/guide 214 for the electrical cable on the flange 215 is adjusted so that its protruding end fits directly into the metal orifice provided for the electrical cable at the lower left corner on the rear of the evaporator and the whole flange assembly is then seated firmly onto the back of the evaporator.

The installer then determines whether the length of the tube 220 needs to be shortened based on the distance between the inner wall panel IWP and the outer wall panel OWP (that is, based on the thickness of the wall). The tube 220 is then cut to length if necessary. If the flange 225 is separate from the tube 220, the tube 220 is then fitted over the lineset/drain hose bundle and is press fitted into the matching opening on the rear of the inside flange 215 and firmly seated. The entire evaporator assembly is now lifted into position so that the tube 220 which protrudes from its rear and contains the lineset/drain hose bundle, lines up with the hole in the wall. The evaporator is then pushed flat onto the wall surface so the tube 220 goes into the wall cavity and the lineset and drain hose protrude out of the exterior wall panel OWP. The evaporator is then secured in place by clipping it onto the mounting bracket provided, completing the mechanical installation process in the interior of the building. Alternatively, if the flange 225 and the outer tube 220 are formed as a single piece, then the evaporator is secured to the wall without first attaching the outer tube 220 to the inner tube 210.

The installer then removes the cover of the terminal box on the front of the evaporator and proceeds to the exterior of the building to complete the installation process. If the faceplate flange 225 is separate from the outer tube 220, the faceplate flange 225 is now attached to the open end of tube 220, and it is oriented so that the drain hose holder/guide 223 is at the lower side of the flange 225, ensuring that the end of the drain hose is directed through the orifice of that holder/guide 223, thus ensuring a sufficient downward pitch from the inside wall panel IWP to the outside wall panel OWP. Alternatively, if the flange 225 and the outer tube 220 are formed as a single piece, then the outer tube 220 (cut to the appropriate length) along with its unitary flange 225 are attached to the flangeless end of the inner tube 210 from outside of the building. In either case, the faceplate flange 225 can be attached to the outer wall panel OWP, for example, with screws if desired. The end of the electrical cable is then inserted through the open end of the faceplate 225 into the tube assembly and through the flexible hose 250/252 held by the holder/guide 214 provided for it on the inside flange 215 so that the cable is directed through the flexible hose stub 250, into the cable channel inside the evaporator and protrudes from the front of the evaporator, leaving sufficient slack to easily connect it to the terminal block. The electrical cable is then secured into place with the cable tie 227 provided as part of the faceplate flange 225 to prevent the cable from being pulled out of the sleeve assembly 200 by the weight of the cable hanging down the wall. The installer then connects up the lineset and the condensate drain hose, bending them 90° so that they point downwards and then installs the hood 230 onto the faceplate flange 225 to cover the opening and make it weatherproof.

The above-described exemplary embodiments are merely illustrative. Various alterations may be made.

What is claimed is:

1. An assembly configured to be mounted in a wall and through which one or more hoses, tubing and electrical cables of an air conditioning unit can pass, the assembly comprising:
   a first tube having a flange attached to a first end of the first tube, the flange configured to be secured against an inner surface of an inner wall panel of the wall, a first hose-guide provided adjacent to the first end of the first tube;
   a second tube having a faceplate flange attached to a second end of the second tube, the faceplate flange configured to be secured against an outer surface of an outer wall panel of the wall, a second hose-guide provided adjacent to the second end of the second tube; and
   a hood configured to be attached to an outer side of the faceplate flange, wherein
   a second end of the first tube and a first end of the second tube are configured to mate with each other,
   a first distance between the first hose-guide and an inner periphery of the first tube is greater than a second distance between the second hose-guide and an inner periphery of the second tube so that a hose guided by the first and second hose-guides will slope downwardly from the first end of the first tube to the second end of the second tube, and
   the hood is configured to cover an opening of the faceplate flange and form a downward-facing exit opening through which the hose, tubing and electrical cables of the air conditioning unit can pass.

2. The assembly of claim 1, further comprising:
   the first hose-guide is a first ring, and
   the second hose-guide is a second ring.

3. The assembly of claim 2, wherein
   the first ring is provided on the flange, and
   the second ring is provided on the faceplate flange.

4. The assembly of claim 1, wherein
   the first hose-guide is provided on the flange, and
   the second hose-guide is provided on the faceplate flange.

5. The assembly of claim 1, further comprising:
   an electrical cable holder located adjacent to the second end of the second tube.

6. The assembly of claim 5, wherein the electrical cable holder is attached to the faceplate flange.

7. The assembly of claim 6, wherein the electrical cable holder is attached to an outer surface of the faceplate flange that faces in a direction opposite from an inner surface of the faceplate flange that is located adjacent to the outer wall panel of the wall.

8. The assembly of claim 7, wherein the electrical cable holder is a cable tie.

9. The assembly of claim 5, wherein the electrical cable holder is a cable tie.

10. The assembly of claim 1, further comprising:
    an electrical cable guide located adjacent to the first end of the first tube.

11. The assembly of claim 10, wherein the electrical cable guide is attached to the flange of the first tube.

12. The assembly of claim 11, further comprising a flexible hose attached to the electrical cable guide for receiving the electrical cable.

13. The assembly of claim 12, wherein an inner end of the flexible hose has a sideway-facing opening to direct the electrical cable laterally out of the flexible hose.

14. The assembly of claim 5, further comprising:
    an electrical cable guide attached to the flange of the first tube.

15. The assembly of claim 14, further comprising a flexible hose attached to the electrical cable guide for receiving the electrical cable.

16. The assembly of claim 15, wherein an inner end of the flexible hose has a sideway-facing opening to direct the electrical cable laterally out of the flexible hose.

17. The assembly of claim 1, wherein
    the second tube includes a channel in a lower side of the second tube, the channel sloping downward as the channel extends from a first end of the second tube toward the second send of the second tube.

18. An assembly configured to be mounted in a wall and through which one or more hoses, tubing and electrical cables of an air conditioning unit can pass, the assembly comprising:
    a first tube having a flange attached to a first end of the first tube, the flange configured to be secured against an inner surface of an inner wall panel of the wall, a first hose-guide provided adjacent to the first end of the first tube, the first tube, the flange and the first hose-guide being a first unitary member;
    a second tube having a faceplate flange attached to a second end of the second tube, the faceplate flange configured to be secured against an outer surface of an outer wall panel of the wall, a second hose-guide provided adjacent to the second end of the second tube, and an electrical cable holder located adjacent to the second end of the second tube, the second tube, the faceplate flange and the electrical cable holder being a second unitary member; and
    a hood configured to be attached to an outer side of the faceplate flange, the hood being a third unitary member, wherein
    a second end of the first tube and a first end of the second tube are configured to mate with each other,
    a first distance between the first hose-guide and an inner periphery of the first tube is greater than a second distance between the second hose-guide and an inner periphery of the second tube so that a hose guided by the first and second hose-guides will slope downwardly from the first end of the first tube to the second end of the second tube, and
    the hood is configured to cover an opening of the faceplate flange and form a downward-facing exit opening through which the hose, tubing and electrical cables of the air conditioning unit can pass.

19. The assembly of claim 18, wherein the electrical cable holder is a cable tie.

20. The assembly of claim 18, further comprising:
    an electrical cable guide attached to the flange of the first tube, the electrical cable guide being part of the first unitary member.

21. The assembly of claim 20, further comprising a flexible hose attached to the electrical cable guide for receiving the electrical cable.

22. The assembly of claim 21, wherein an inner end of the flexible hose has a sideway-facing opening to direct the electrical cable laterally out of the flexible hose.

* * * * *